(12) United States Patent
Meyer

(10) Patent No.: US 7,114,942 B2
(45) Date of Patent: Oct. 3, 2006

(54) APPARATUS FOR PRODUCING SYNTHETIC RESIN FILM

(75) Inventor: Helmut Meyer, Toisdorf (DE)

(73) Assignee: Reifenhauser GmbH & Co. Maschinenfabrik, Troisdorf (DE)

( * ) Notice: Subject to any disclaimer, the term of this patent is extended or adjusted under 35 U.S.C. 154(b) by 165 days.

(21) Appl. No.: 10/620,290

(22) Filed: Jul. 15, 2003

(65) Prior Publication Data

US 2004/0086587 A1    May 6, 2004

(30) Foreign Application Priority Data

Aug. 1, 2002    (EP) .................................. 02017266

(51) Int. Cl.
*B29C 47/90*    (2006.01)

(52) U.S. Cl. ...................... 425/326.1; 425/66; 425/461; 264/209.5; 384/527

(58) Field of Classification Search ............. 425/326.1, 425/66, 461; 264/209.5; 384/527
See application file for complete search history.

(56) References Cited

U.S. PATENT DOCUMENTS

| 3,199,934 | A | * | 8/1965 | Van Wyk | ..................... 384/527 |
| 3,980,418 | A | * | 9/1976 | Schott, Jr. | ................... 425/72.1 |
| 3,993,723 | A | * | 11/1976 | Davis et al. | ................. 264/559 |
| 4,749,346 | A | | 6/1988 | Planeta | |
| 5,222,816 | A | * | 6/1993 | Kondoh et al. | ............. 384/463 |
| 5,271,679 | A | | 12/1993 | Yamazumi et al. | |
| 5,912,021 | A | | 6/1999 | Planeta | |
| 6,203,207 | B1 | * | 3/2001 | Yamamoto et al. | ......... 384/492 |

FOREIGN PATENT DOCUMENTS

| DE | 2 004 881 | 8/1971 |
| EP | 0906823 | 4/1999 |

* cited by examiner

*Primary Examiner*—Joseph S. Del Sole
*Assistant Examiner*—Maria Veronica Ewald
(74) *Attorney, Agent, or Firm*—Andrew Wilford

(57) ABSTRACT

A calibrating basket for a film blowing tube is provided with roller bearings to prevent stripe formation on the film and pinching of the film between the rollers.

6 Claims, 4 Drawing Sheets

APPARATUS FOR PRODUCING SYNTHETIC RESIN FILM

FIELD OF THE INVENTION

My present invention relates to an apparatus for producing synthetic resin film by the film-blowing process and, more particularly, to a sizing or calibrating apparatus which determines at least the outer diameter of the blown thermoplastic tube.

BACKGROUND OF THE INVENTION

In the production of blown film, the film-making apparatus comprises an extruder for extruding a thermoplastified synthetic resin tube which is expanded by blowing and is passed through a calibrating basket which serves to define the expanded diameter of the blown tube and thus determines the thickness of the film.

The calibrating basket is provided with guide stirrups which guide the synthetic resin tube and have foil guide rollers whose outer peripheries contact the film of the tube.

In such a calibrating basket, around the periphery of the calibrating basket and thus over the periphery of the synthetic resin tube guided through it, there are distributed a multiplicity of such guide stirrups. These guide stirrups are distributed in the longitudinal direction of the calibrating basket and, therefore, the direction of travel of the tube. The guide stirrups are provided with guide rods on which a multiplicity of film guide rollers can be provided next to on another, i.e. in neighboring relationship. The guide rods of a guide stirrup can be bent to match the shape of the synthetic resin tube.

In the past, the rollers have operated in accordance with the slide-bearing principle, i.e. were free from rolling surfaces and had relatively movable surfaces that slid on one another. These slide surfaces, could be made from a low friction material like polytetrafluoroethylene. In a special case, the guide rollers were hollow cylindrical bodies made from Teflon and were slipped onto the guide rods. Slide bearing rollers rotate around the guide rods or rest thereon generally in such manner that there are two points of contact between the slide bearing roller and the rod. A substantial amount of friction heat is generated with these rollers and sliding surfaces may even partially melt because of the friction heat which is generated. This melting of the guide rollers can result in fusion of them to the guide rods so that the guide rollers no longer are rotatable or can give rise to irregular rotation.

Immobilization of such a roller can result in the undesirable marking of the film with contact stripes. When some rollers rotate and others do not, the film may be pinched between adjacent rollers and that has a detrimental effect on film quality or increases the reject rate.

Conventional film guide rollers of the type described also have problems when the foil is somewhat tacky since then the friction between the foil rollers may be excessive and the rollers may develop rotational oscillation which can also result in film marking or detrimental calibration.

OBJECTS OF THE INVENTION

It is, therefore, the principal object of the present invention to provide a film-blowing apparatus and especially a blown tube calibrating apparatus whereby these drawbacks can be avoided.

Another object of the invention is to provide an improved apparatus for controlling the size of a blown extruded thermoplastic synthetic resin film tube which eliminates marking of the film and other problems with respect to the guidance of the film that have been encountered heretofore.

SUMMARY OF THE INVENTION

These objects and others which will be apparent hereinafter are attained in accordance with the invention in an apparatus for controlling the size of a blown extruded thermoplastic synthetic resin film tube which comprises a calibrating basket through which the blown extruded thermoplastic synthetic resin film tube passes and formed with guide stirrups, each having a multiplicity of tube-contacting film-guide rollers disposed along each of the stirrups and supported on the respective stirrup with a respective roller bearing.

In accordance with the invention, therefore, the film guide rollers are roller bearing rollers and particularly ball bearing rollers.

The inner ring, according to the invention, may be fixed to the guide stirrup and can carry the outer ring through the array of roller elements, e.g. balls. The fact that the inner ring may be fixed means that the inner ring is not itself rotatable on the stirrup and generally is not shiftable thereon and can be itself fixed on the rod. The outer ring is rotatable on the inner ring by virtue of the array of balls therebetween. The inner ring and/or the outer ring may be made of a plastic, for example, a nylon. The roller elements themselves are preferably of a metal, for example steel. Roller bodies of glass may however also be used and the outer ring or the portion forming the roller may itself have an outer jacket, sheath or coating of an antiadhesion material such as polytetrafluoroethylene. The latter is especially suitable where the blown film tends to be somewhat tacky.

Between the rollers mounted on the stirrup, i.e. the rollers which are neighboring one another on the rod, a gap of preferably 0.5 mm to several mm in width may be provided.

The use of roller bearing rollers by comparison to slide bearing rollers of the prior art has been found to make the guiding of the blown film tube more reliable and free from problems. The calibration is more precise, high friction is avoided, the heat generated is substantially reduced and the wear of the rollers is practically eliminated. Strip formation on the film is eliminated and jamming of the rotation of the rollers is no longer observed. Pinching of the foil between neighboring foil guide rollers is likewise eliminated.

The problem encountered with earlier basket-type calibrators are minimized or eliminated completely. Furthermore, baskets according to the invention can be readily applied to existing equipment in a simple and mechanical manner. Retrofitting of existing foil-blowing systems is no problem.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
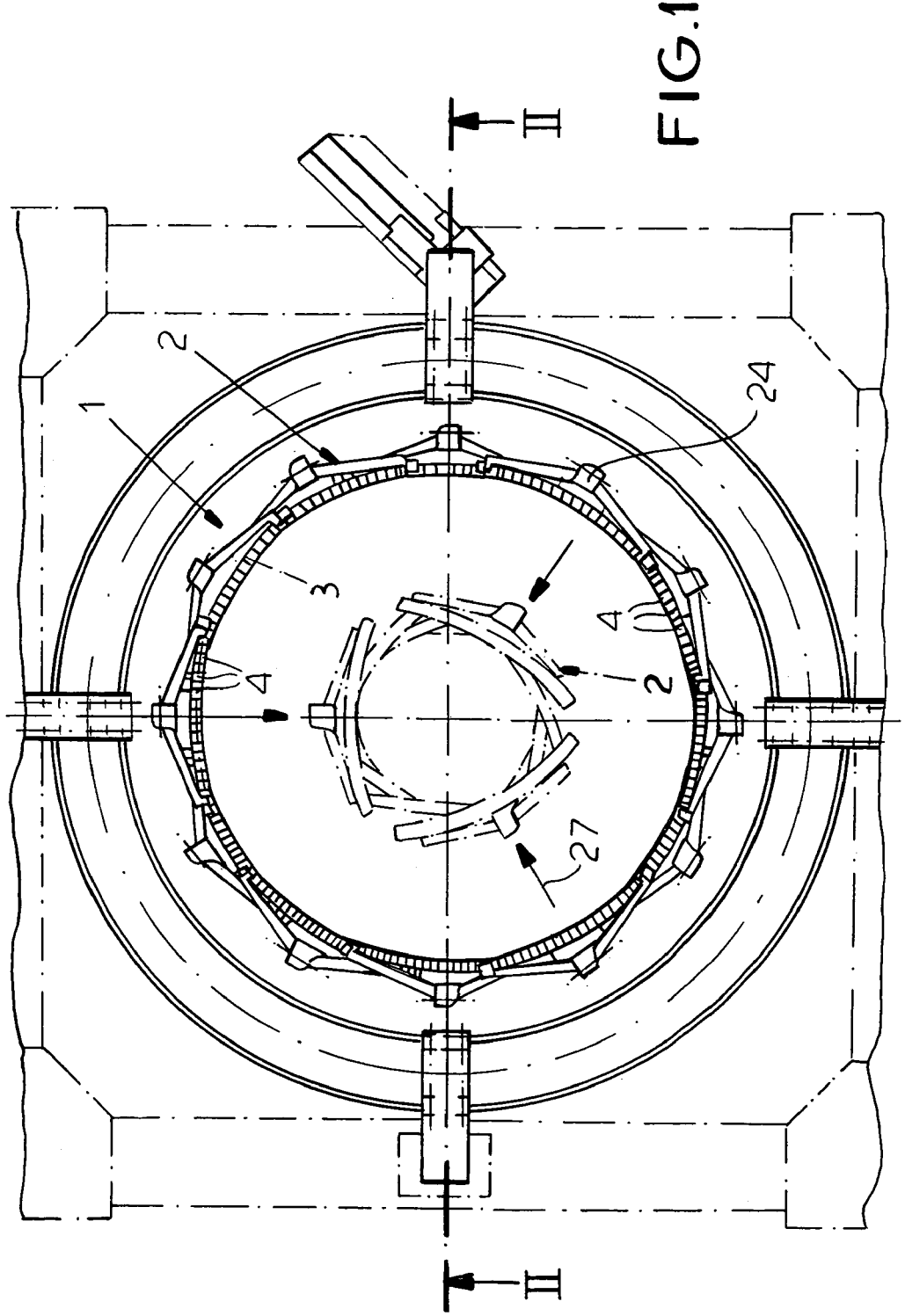
FIG. 1 is a front elevational view of a calibrating basket for use in the blowing of a thermoplastic synthetic resin film.
Figure 2:
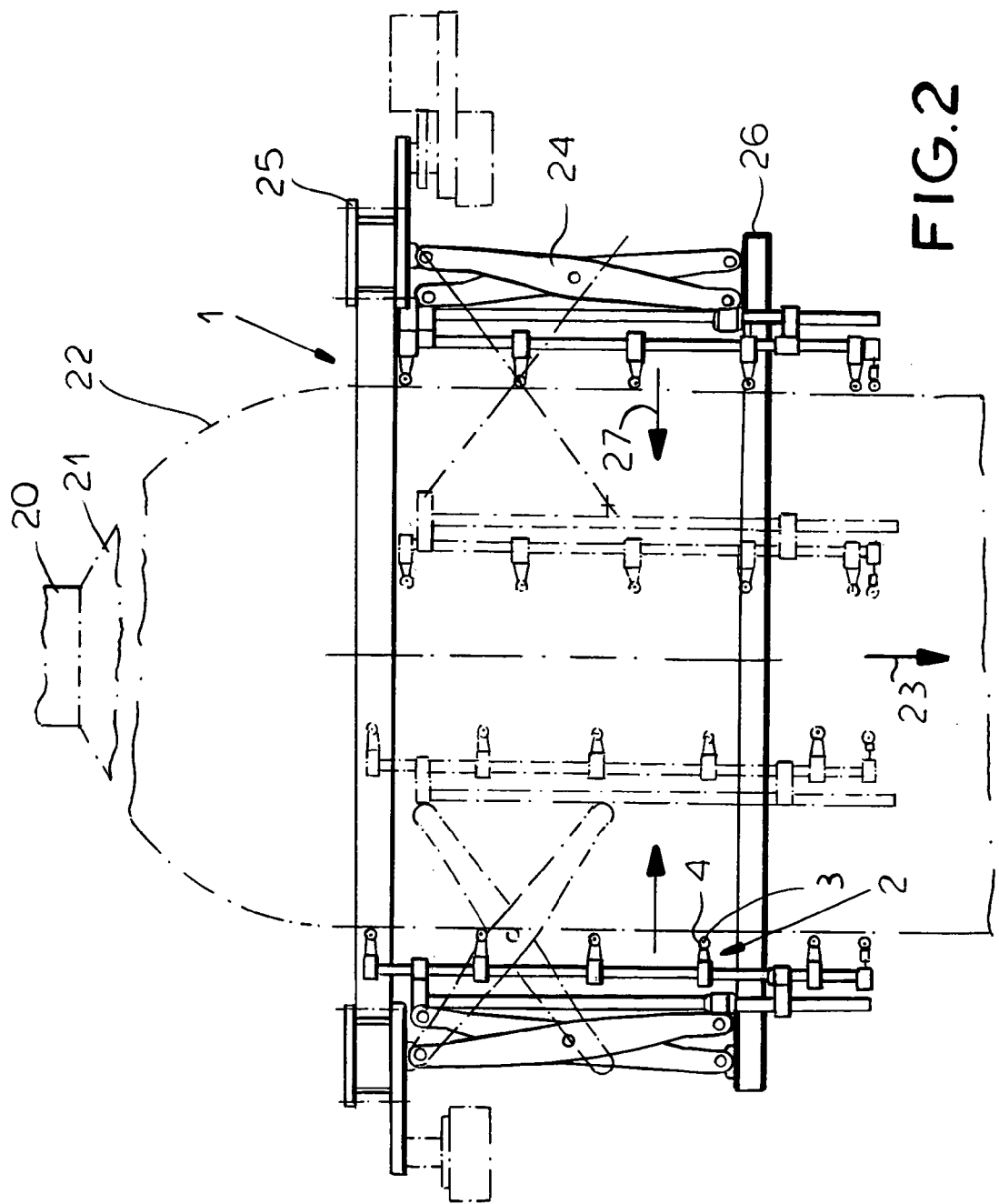
FIG. 2 shows a basket in place and is a section taken along line II—II of the basket of FIG. 1.

FIGS. 1 and 2 of the drawing show a calibrating part of an apparatus for blowing a plastic foil or film. The apparatus includes an extrusion and blowing head 20 from which a thermoplastified synthetic resin is extruded at 21 and blown at 22 to form the foil or film tube as it is advanced in the direction represented by the arrow 23. The extruded thermoplastified synthetic resin tube 22 passes through a calibration basket 1 which fixes the outer diameter of the tube and thus controls the wall thickness thereof and hence the thickness of the blown film. The film can be polyethylene, for example.

The calibration basket 1 is provided with an array of guide stirrups 2 which, as shown in FIGS. 1 and 2 can be mounted on a respective scissor link mechanisms 24 between a pair of rings 25 and 26, the upper ring 25 of which may be fixed to allow the basket diameter to be increased or decreased (compare the dot-dash positions shown in FIGS. 1 and 2). In this sense, the calibration basket 1 opens and closes like the diaphragm of a lens.

The stirrups 2 are each equipped with a plurality of bent guide rods 3 on each of which a row of film or foil guide rollers 4 is mounted. The foil guide rollers 4 engage the outer periphery of the film tube 22. Thus a multiplicity of the guide stirrups 2 with guide rods 3 are distributed over the periphery of the calibrating basket 1. The radial arrows 27 in FIGS. 1 and 2 represent the contraction of the basket 1 from its fully spread state as shown in solid lines.

From FIGS. 1 and 2 it will also be apparent that a multiplicity of the guide stirrups 2 with guide rods 3 are distributed over the periphery of the calibrating basket 1. The radial arrows 27 in FIGS. 1 and 2 represent the contraction of the basket from its fully calibrated state as shown in solid lines.

Figure 3:
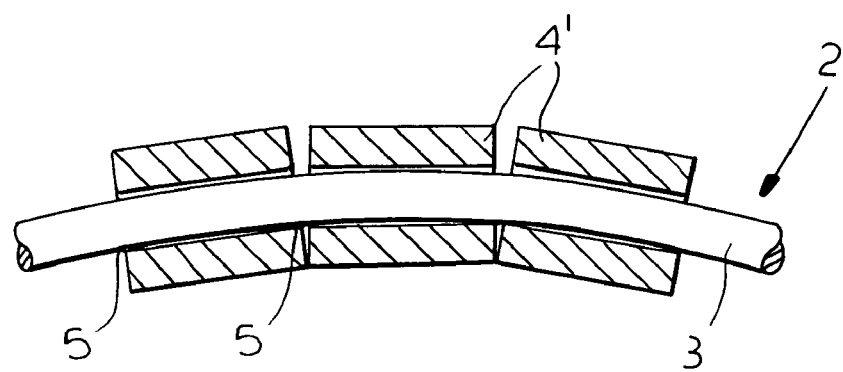
FIG. 3 is an illustration of a part of the basket in a prior art construction.

From FIG. 3 it will be apparent that the guide rollers 4' of the prior art were slide bearing rollers in the form of hollow cylindrical bodies which were in sliding contact with the rod 3. These rollers engage the rod only at two contact points 5 with the disadvantages previously discussed.

Figure 4:
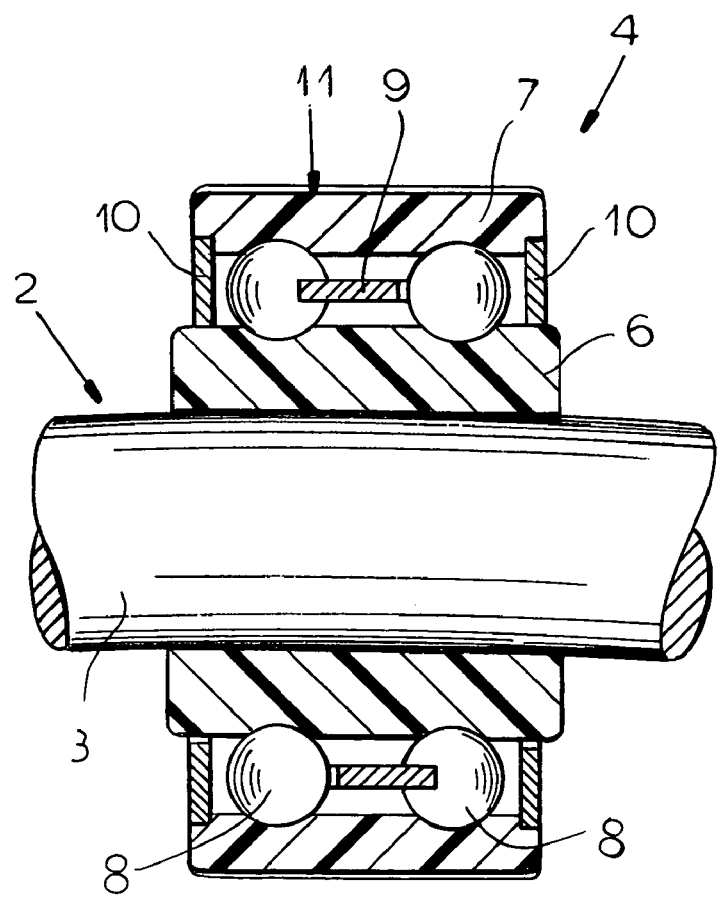
FIG. 4 is a cross section through a roller of the invention.
Figure 5:
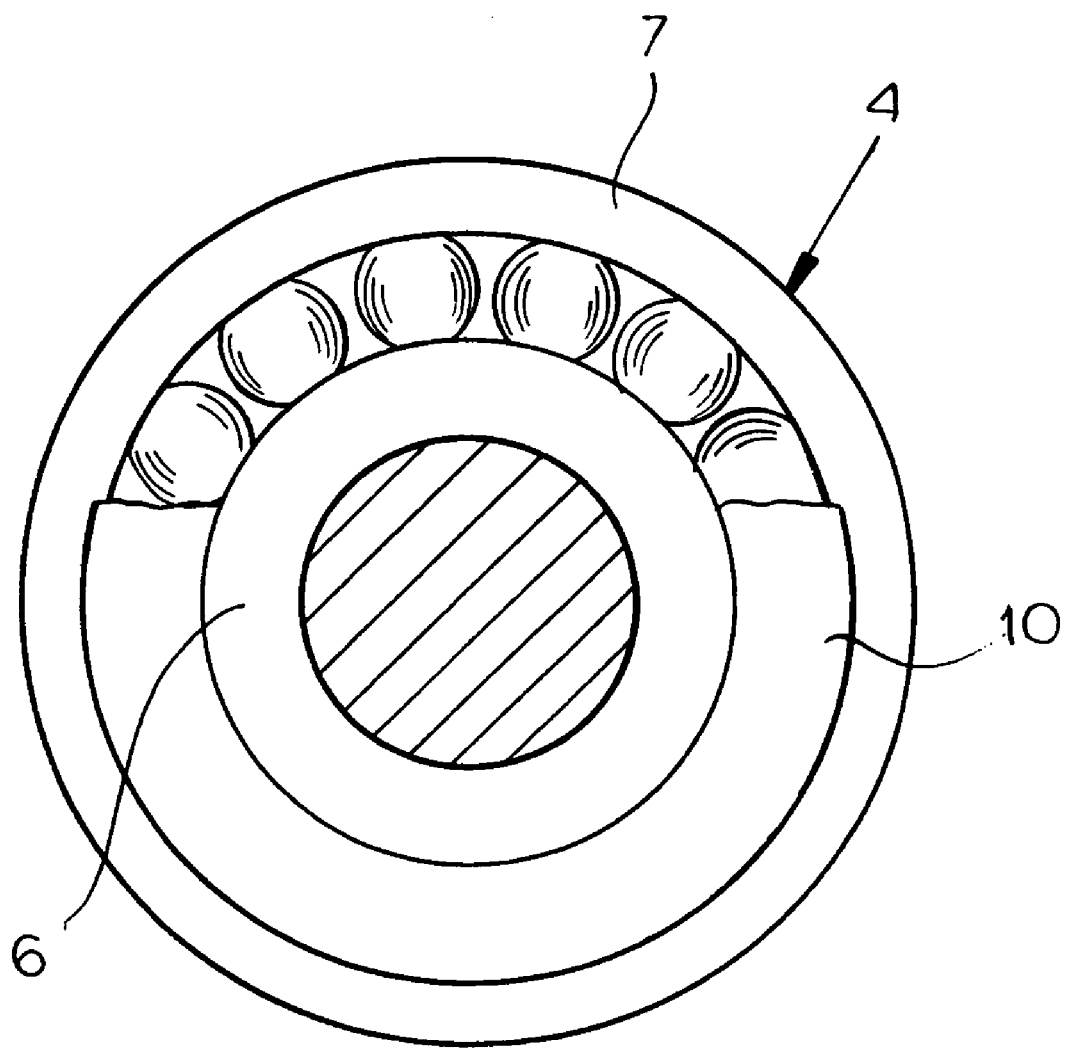
FIG. 5 is an end view of this roller, partly broken away.

FIGS. 4 and 5 show the rollers 4 of the present invention, i.e. the roller bearing rollers with their inner ring 6 which can be fixed on the rod 3 so that they are neither rotatable nor axially shiftable. The outer ring 7, however, is rotatable on the inner ring 6 via the array of bearing balls 8 which can be received in a cage 9. The ends of the bearing are closed by disks 10. The bearing balls are composed of metal, for example steel, or of glass and the rings 6 are composed preferably of a plastic like nylon. In a preferred embodiment a surface coating 11 on the outer ring 7 can be composed of an antiadhesion material like Teflon.

The rollers 4 may lie in contact with one another or have a small gap between them.

I claim:

1. An apparatus for controlling the size of a blown extruded thermoplastic synthetic resin film tube, the apparatus comprising: a calibrating basket through which the blown extruded thermoplastic synthetic resin film tube passes and formed by an array of guide stirrups; and a respective row of tube-contacting film-guide rollers disposed along each of the stirrups; and a respective row of tube-contacting film-guide rollers disposed along each of the stirrups and each including an inner ring fixed to the respective stirrup, an outer ring coaxially surrounding the inner ring, an array of roller bodies supporting the outer ring rotatably on the inner ring, and a respective cage between the rings holding the roller bodies, the outer rings having outer surfaces engaging the tube.

2. The apparatus defined in claim 1 wherein said roller bodies are balls.

3. The apparatus defined in claim 1 wherein at least one of said rings is composed of a synthetic resin.

4. The apparatus defined in claim 1 wherein the outer surfaces of said outer rings each have an antiadhesion coating.

5. The apparatus defined in claim 1 wherein a gap is provided between neighboring rollers on each stirrup.

6. An apparatus for controlling the size of a blown extruded thermoplastic synthetic resin film tube, the apparatus comprising:

a calibrating basket through which the blown extruded thermoplastic synthetic resin film tube passes and formed by an array of guide stirrups; and a respective row of tube-contacting film-guide rollers disposed along each of the stirrups and each including an inner ring fixed to the respective stirrup, an outer ring coaxially surrounding the inner ring, and an array of roller bodies supporting the outer ring rotatably on the inner ring, the outer rings having outer surfaces engaging the tube.

* * * * *